US012361827B2

(12) United States Patent
Dürr

(10) Patent No.: US 12,361,827 B2
(45) Date of Patent: Jul. 15, 2025

(54) AUTONOMOUS TRANSPORTATION NETWORK WITH JUNCTION CONTROL METHOD

(71) Applicant: DROMOS GMBH, Munich (DE)

(72) Inventor: Martin Dürr, Munich (DE)

(73) Assignee: DROMOS GMBH, Munich (DE)

( * ) Notice: Subject to any disclaimer, the term of this patent is extended or adjusted under 35 U.S.C. 154(b) by 116 days.

(21) Appl. No.: 17/919,426

(22) PCT Filed: Feb. 4, 2021

(86) PCT No.: PCT/EP2021/052602

§ 371 (c)(1), (2) Date: Oct. 17, 2022

(87) PCT Pub. No.: WO2021/209178

PCT Pub. Date: Oct. 21, 2021

(65) Prior Publication Data

US 2023/0162603 A1 May 25, 2023

(30) Foreign Application Priority Data

Apr. 17, 2020 (GB) ...................................... 2005607

(51) Int. Cl.
*G08G 1/0967* (2006.01)
*G08G 1/16* (2006.01)

(52) U.S. Cl.
CPC . *G08G 1/096725* (2013.01); *G08G 1/096741* (2013.01); *G08G 1/096775* (2013.01);
(Continued)

(58) Field of Classification Search
CPC ....... G08G 1/096725; G08G 1/096741; G08G 1/096775; G08G 1/096783; G08G 1/164; G08G 1/166
See application file for complete search history.

(56) References Cited

U.S. PATENT DOCUMENTS 9,517,777 B2 * 12/2016 Hall ...................... B60W 30/12
9,536,427 B2 1/2017 Tonguz et al.
(Continued)

FOREIGN PATENT DOCUMENTS

CN 108281026 A 7/2018
DE 102017007814 A1 3/2018
(Continued)

*Primary Examiner* — Ashley L Redhead, Jr.

(74) *Attorney, Agent, or Firm* — 24IP Law Group USA, PLLC; Timothy R. DeWitt

(57) ABSTRACT

A method of controlling a plurality of autonomous vehicles (20) entering a junction (56) from a plurality of inward routes (60*a*, 60*b*) and leaving the junction (56) in at least one outward route (65) is disclosed. The method comprises calculating a first time slot (80-1) for entering the junction (56) on a first inward route (60*a*) wherein the first time slot (80-1) has a first entry time at which the first autonomous vehicle (20-1) enters the junction (56) and adjusting the velocity of the first autonomous vehicle (20-1) by an onboard processor (27) such that the first autonomous vehicle (20-1) arrives at the junction (56) at the first entry time. A second time slot (80-2) for entering the junction (56) for a second autonomous vehicle (20-2) is then calculated. The second time slot (80-2) has a second entry time at which the second autonomous vehicle (20-2) enters the junction (56) and the second entry time is later than the first entry time such that the second autonomous vehicle (20-2) does not impact the first autonomous vehicle (20-1). The velocity of the second autonomous vehicle (20-1) is adjusted by the onboard processor (27) to arrive at the second entry time.

14 Claims, 5 Drawing Sheets

(52) U.S. Cl.
CPC ....... *G08G 1/096783* (2013.01); *G08G 1/164* (2013.01); *G08G 1/166* (2013.01)

(56) References Cited

U.S. PATENT DOCUMENTS

| | | | | |
|---|---|---|---|---|
| 10,037,694 | B2 * | 7/2018 | Lee | G08G 1/162 |
| 10,345,805 | B2 | 7/2019 | Seally | |
| 10,437,256 | B2 | 10/2019 | Andert et al. | |
| 2012/0173130 | A1 * | 7/2012 | Tsuda | G08G 1/096716 701/117 |
| 2013/0018572 | A1 | 1/2013 | Jang | |
| 2013/0135117 | A1 * | 5/2013 | Morimoto | G08G 1/092 340/905 |
| 2013/0304279 | A1 | 11/2013 | Mudalige et al. | |
| 2015/0100224 | A1 * | 4/2015 | Tsuda | G08G 1/096783 701/117 |
| 2015/0260535 | A1 * | 9/2015 | Yoshida | G05D 1/0297 701/25 |
| 2016/0129920 | A1 * | 5/2016 | Hall | B60W 40/08 701/1 |
| 2018/0004211 | A1 * | 1/2018 | Grimm | G05D 1/0066 |
| 2018/0275678 | A1 * | 9/2018 | Andert | G08G 1/164 |
| 2019/0072968 | A1 * | 3/2019 | Will, IV | G06N 3/006 |
| 2019/0096239 | A1 * | 3/2019 | Houssami | G05D 1/021 |
| 2019/0172344 | A1 * | 6/2019 | Baik | G08G 1/0141 |
| 2019/0196500 | A1 | 6/2019 | Harasaki | |
| 2019/0236948 | A1 * | 8/2019 | Wang | G08G 1/096725 |
| 2019/0384302 | A1 * | 12/2019 | Silva | B60W 60/00272 |
| 2020/0012295 | A1 | 1/2020 | Kim | |
| 2020/0211377 | A1 * | 7/2020 | Chen | G08G 1/0133 |
| 2021/0188297 | A1 * | 6/2021 | Wray | B60W 50/0098 |
| 2022/0324480 | A1 * | 10/2022 | Tsunekazu | B60W 60/001 |
| 2023/0141726 | A1 * | 5/2023 | Motozuka | H04W 76/30 455/500 |

FOREIGN PATENT DOCUMENTS

| | | | |
|---|---|---|---|
| DE | 102016219394 | A1 | 4/2018 |
| DE | 102017215564 | A1 | 3/2019 |
| EP | 3 686 861 | A1 | 10/2018 |
| WO | 2019080841 | A1 | 5/2019 |

* cited by examiner

AUTONOMOUS TRANSPORTATION NETWORK WITH JUNCTION CONTROL METHOD

CROSS REFERENCE TO RELATED APPLICATIONS

This application claims priority of UK Patent Application number 2005607.3 filed on 17 Apr. 2020. The entire disclosure of the UK Patent Application 2005607.3 is hereby incorporated herein by reference. This application is a national phase entry from PCT Application PCT/EP2021/052602 published as WO 2021/2019178.

SUMMARY OF THE INVENTION

The invention relates to a method for controlling a plurality of autonomous vehicles entering a junction.

BACKGROUND TO THE INVENTION

The term "automated transit network" or "automated transportation network" (abbreviated to ATN) is a relatively new designation for a specific transit mode that falls under the larger umbrella term of "automated guideway transits" (AGT). Before 2010, the name "personal rapid transit (PRT)" was used to refer to the ATN concept. In Europe, the ATN has been referred to in the past as "podcars".

Like all forms of AGT, ATN is composed of automated and autonomous vehicles that run on an infrastructure and are capable of carrying passengers from an origin to a destination. The autonomous vehicles are able to travel from the origin to the destination without any intermediate stops or transfers, such as are known on conventional transportation systems like buses, trams (streetcars) or trains. The ATN service is typically non-scheduled, like a taxi, and travelers are able to choose whether to travel alone in the vehicle or share the vehicle with companions.

The ATN concept is different from self-driving cars which are starting to be seen on public streets. The ATN concept has most often been conceived as a public transit mode similar to a train or bus rather than as an individually used consumer product such, as a car. Current design concepts of the ATN currently rely primarily on a central control management for controlling individually the operation of the autonomous vehicles on the ATN.

On the other hand, the self-driving cars are often described as being "autonomous", but in practice, there are different classes or levels of vehicle autonomy. The degree of vehicle autonomy is typically divided in five levels, as set out by the On-Road Automated Driving (ORAD) committee of the Society of Automotive Engineers (SAE) in "Taxonomy and definitions for terms related to driving automation systems for on-road motor vehicles" published in Recommended Practice SAE J 3016 on 15 Jun. 2018. Level 0 refers to a vehicle that has no driving automation. The driver of the vehicle is fully in charge of operating the movement of the vehicle. Vehicles of Level 0 may include safety systems such as, for example, a collision avoidance alert. Level 1 refers to vehicles having at least one driving assistance feature such as an acceleration or braking assist system. The driver is responsible for the driving tasks but is supported by the driving assist system which is capable of affecting the movement of the vehicle. Level 2 describes vehicles having more than one assist system for actively affecting the movement of the vehicle. The driver, in Level 2, is still responsible for the driving tasks and must actively monitor the trajectory of the vehicle at all times. The driver is, however, actively supported by the assist systems. Level 3 describes a so-called "conditional automation" of the vehicle. The vehicle is capable of autonomously driving in certain situations and with limitations. The driver is not required to actively monitor the assist system but is, however, required to take control of a driving situation if requested by the assist system. Level 4 describes autonomously travelling vehicles which are capable of travelling specific routes under normal conditions without human supervision. The vehicles of Level 4 can therefore operate without a driver but might need remote human supervision in case of conflict situations, travelling in remote areas, or when travelling extreme weather conditions. Level 5 Automation describes fully autonomously driving vehicles. No human interaction is required at any time for the operation of the vehicles.

The reliance of the existing ATN networks on a central control management leads to a bottleneck in that each of the autonomous vehicles needs to be in almost continuous communication with the central control management. This can result in problems if the communications network is overloaded or there is a major incident somewhere in the ATN network that requires action from the central control management. Bottlenecks can also occur at junctions at which several autonomous vehicles arrive substantially simultaneously from different directions on different inward routes and may need to exit the junction using the same outward route. The central control management must decide which one(s) of the autonomous vehicles are to be given priority at the junction and manage the process of negotiating the autonomous vehicle through the junction, which can fail if the response time is not fast enough. This can lead to unnecessary waiting time at the junction with consequent waste of resources, such but not limited to energy or utilization of the autonomous vehicle.

An example of such as central control management is outlined in U.S. Pat. No. 10,345,805 (Seally, assigned to Podway Inc.) in which the central control management receives a request from an autonomous vehicle for a route from the origin to the destination. The central control management calculates the route and sends to the autonomous vehicle a journey instruction set to allow the autonomous vehicle to navigate from the origin to the desired destination along the calculated route. The central control management in this system needs to transmit large amounts of data from the autonomous vehicles and gather data from the autonomous vehicles on a continuous basis. This requires a large amount of hardware and data bandwidth and can cause a problem if an autonomous vehicle enters an area in which connectivity is poor. In the event of a breakdown of the central control management, then the autonomous vehicles will no longer be able to navigate or recalculate journeys.

Many current ATN concepts rely on guideways being built as part of the infrastructure. This may have its advantages when dedicated infrastructure separate from other traffic flows or pedestrians can be designed. The cost of the provision of the guideways is significant and this will delay the development of the ATN network. One example of such a guideway is the infrastructure that can be seen in London Heathrow airport's Terminal 5.

A report on "Automated Transit Networks (ATN): A Review of the State of the Industry and Prospects for the Future" published by the Mineta Transportation Institute, Report No 12-31 in September 2014 reported that at the date of writing no ATN having more than ten stations had been implemented in the world. Currently the ATN networks operate on the principle of mapping each of the origins to all of the destinations. This leads to a matrix with 20 entries even for a simple five-station system as there are four possible destinations from each of the five origins. A ten-station system would have 90 possible routes and it will be seen that as the number of origins and destinations increases, then an O/D matrix listing all of the possible routes will expand out of hand.

The addition of junctions into the mapping system further complicates the map as paths have to be created to take into account potential conflicts between the autonomous vehicles in the ATN at the junctions.

The current systems are therefore not scalable.

A further issue that has been identified in the ATN network is the handling of multiple vehicles and prioritizing of access for priority vehicles, such as paramedics or police. A solution is offered in U.S. Pat. No. 9,536,427 (Tonguz et al, assigned to Carnegie Mellon). The solution uses vehicle-to-vehicle communication to establish a priority zone as required.

Other patent documents are known for coordinating the movement of autonomous vehicles. For example, German Patent Application No DE 10 2017 007 814 A1 (Scania) teaches a method for coordinating the movement of autonomous vehicles to arrive a point at which a platoon or column of autonomous vehicles are put together. German Patent Application No DE 10 2017 215 564 (Bosch) teaches a method for calculating an optimal route to a point at which passengers can change vehicles.

One method for enabling autonomous vehicles to move through merging or branching junctions is shown in US Patent Application US 2019/196500 A1 (Harasaki, assigned to Murata Machinery).

US 2019/236948 A1 (Fujitsu) describes a system and method for intersection management for managing the passage of a plurality of the autonomous vehicles at an intersection or junction of two roads. An intersection manager is located at or near the intersection for managing the passage of the plurality of the autonomous vehicles and avoiding conflicts between the autonomous vehicles traversing the intersection. The autonomous vehicles wising to traverse the intersection send a traversing request to request a block of exclusive space-time resource of an intersection zone in order to traverse or cross through the intersection. The traversing request includes an earliest arrival time at the intersection zone, a position, a vehicle speed, an entry lane of an intersection, a departure lane of the intersection, and vehicle properties. The vehicle properties include a vehicle identity number, a width, a length, a maximum speed, a maximum acceleration, and a maximum deceleration. The method described allows the reservation of a trajectory or an exclusive block of space-time resource to satisfy the traversing request. If the reservation is approved by the intersection manager, the autonomous vehicle is informed that the autonomous vehicle is able to proceed through the intersection by receiving an approved reservation. The received approved reservation comprises information about a reserved trajectory including an entry time for the entry of the autonomous vehicle into the intersection, a traversing time for the autonomous vehicle to traverse through the intersection, and a traversing speed defined by the intersection manager for the traversing of the intersection.

US Patent Application US 2013/304279 A1 discloses a system and method for continuously allowing a plurality of autonomous vehicles to travel through an intersection. The travel through the intersection is done using synchronized and staggered timeslots for the crossing of the autonomous vehicles. The autonomous vehicles comprises a map database, a navigation system, and an autonomous vehicle controller. The system enables a number of time slot cells. Each time slot cell represents a location that a vehicle could be in at any particular point in time for a particular traffic flow pattern. The intersection has stop lines or inbound lanes. The stop lines represent a place where the autonomous vehicle traveling in a particular lane needs to stop so that the autonomous vehicle enters the intersection at the proper time to be in synchronization with other ones of the autonomous vehicles in the other lanes. In order to prevent the autonomous vehicles from colliding with each other, only one of the autonomous vehicles can be in a particular cell at a particular point in time.

The staggering of the entry of the vehicles into the intersection based on vacation of a particular time slot cell by one autonomous vehicle before the next autonomous vehicle enters that time slot cell. Depending on traffic volume and other factors, the autonomous vehicle controller controls the autonomous vehicles so that the autonomous vehicles arrive at the intersection in a staggered format or are stopped at the stop lines until the time for the particular autonomous vehicle to enter the intersection arrives. The size of the time slot cells is dependent on the speed of the autonomous vehicles and the size of the autonomous vehicles.

U.S. Pat. No. 10,437,256 B2 discloses a system, method, and apparatus for controlling autonomous or semi-autonomous vehicles at an intersection using an intersection manager. The apparatus for intersection management receives intersection crossing requests from one or more of the autonomous or semi-autonomous vehicles. The apparatus includes an analyzer for processing the received crossing request. Using the analyzer, the apparatus processes the intersection crossing requests and generates a command. The command comprises a crossing velocity for the autonomous vehicle, and a time at which to commence the crossing velocity. The command is transmitted, using an output interface, to the requesting one of the autonomous vehicles.

Methods for controlling the operation of an autonomous vehicle are shown in US Patent Application Publication No 2020/012295 (Kim, assigned to LG Electronics). The prior art documents teach the use of centralized intersection or junction management controllers to control the autonomous vehicles passing through the intersections or junctions. These single intersection or junction management controllers are liable to failure or to overloading, for example if there are a large number of vehicles in the autonomous vehicle network. There is therefore a need for providing a resilient method of controlling a plurality of autonomous vehicles entering the intersection or junction.

SUMMARY OF THE INVENTION

This document describes a method of controlling a plurality of autonomous vehicles entering a junction from a plurality of inward routes and leaving the junction in at least one outward route, wherein the controlling comprises coordinating of the autonomous vehicles. The method enables the control and coordination of the passage through the junction by a plurality of the autonomous vehicles to avoid conflicts. In one aspect, the method comprises calculating a first time slot for entering the junction on a first inward route for a first autonomous vehicles. The first time slot has a first entry time at which the first autonomous vehicle enters the junction and is communicated from a beacon to the first autonomous vehicle. The velocity of the first autonomous vehicle is then adjusted by an onboard processor such that the first autonomous vehicle arrives at the junction at the first entry time and is able to enter the reserved slot on the junction.

A second time slot for entering the junction for a second autonomous vehicle of the plurality of autonomous vehicles arriving on a second inward route different from the first inward route of the first autonomous vehicle. The second time slot has a second entry time at which the second autonomous vehicle enters the junction and wherein the second entry time is later than the first entry time such that the second autonomous vehicle does not impact the first autonomous vehicle. The second time slot data real including the second entry time is communicated from the beacon to the second autonomous vehicle and the second autonomous vehicle adjusts, using the onboard processor, its velocity to arrive at the second entry time, which will be after the first autonomous vehicle has left the junction. Thus, a conflict between the first autonomous vehicle and the second autonomous vehicle is avoided at the junction.

In a further aspect, a third time slot for entering the junction is set for a third autonomous vehicle of the plurality of autonomous vehicles. The third autonomous vehicle is travelling parallel to the first autonomous vehicle on a same one of the first inward route and the third time slot has a third entry time at which the third autonomous vehicle may enter the junction. The third time slot including the third entry time is communicated from the beacon to the third autonomous. The third entry time is later than the first entry time; and the velocity of the third autonomous vehicle is adjusted by the onboard processor so that the third autonomous vehicle arrives at the third entry time.

The durations of the first time slot, the second time slot and the third time slot is dependent on the type of the ones of the autonomous vehicles entering the junctions.

The autonomous vehicles can in another aspect exit the junction on a plurality of outward routes.

The method comprises transmitting to the beacon an identification of the autonomous vehicle when the autonomous vehicle is near the beacon. This enables the junction controller to confirm that the autonomous vehicle is expected.

This document also discloses a junction administration system for administering a flow of autonomous vehicles entering a junction on a plurality of inward routes and leaving the junction on at least one outward route. The junction administration system comprises a processor for calculating a plurality of adjacent time slots and allocating single of the time slots to ones of the autonomous vehicles desiring to enter the junction and a beacon for communicating the allocated one of the time slots to a corresponding one of the autonomous vehicles.

This document discloses a method for controlling an autonomous vehicle entering a junction comprises receiving from a beacon time slot data including a unique entry time for indicating the time of entry of the autonomous vehicle at the junction, calculating in an onboard processor required time from position of receipt of time slot data to the junction, and adjusting, by the onboard processor, the velocity of the autonomous vehicle to enable arrival at the junction at the unique entry time.

In one aspect, the autonomous vehicles include assist systems of Level 2 or Level 3, as described above. Using the onboard processor, the autonomous vehicles are capable of autonomously travelling in the transportation network. The autonomous vehicles, therefore, do not require a driver for driving of the autonomous vehicle.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
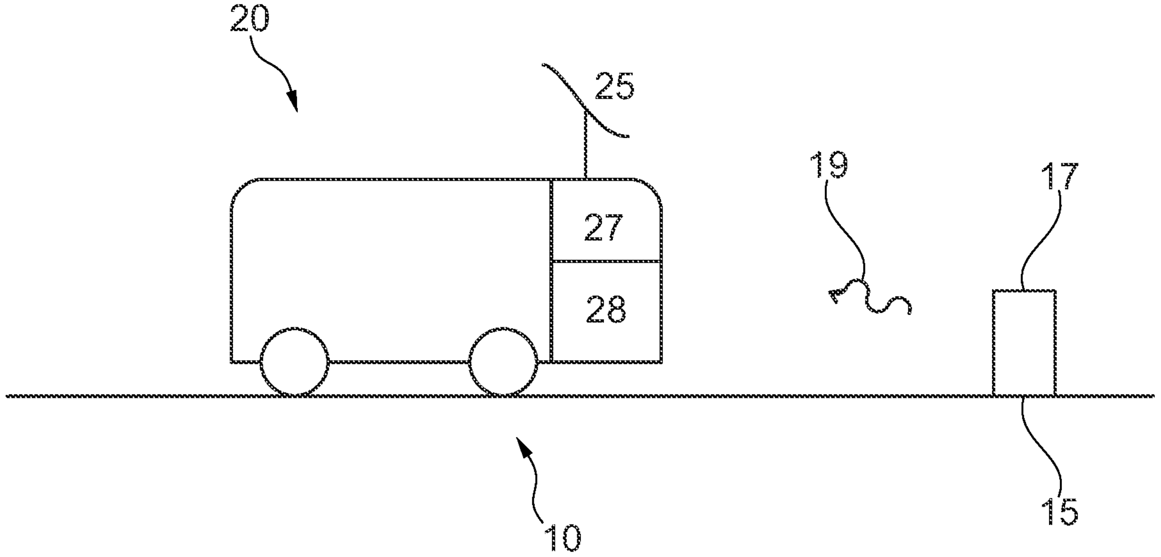
FIG. 1 shows an overview of the ATN of this document.

FIG. 1 shows a first example of an autonomous transportation network 10 according to one aspect of this document. The autonomous transportation network has a plurality of autonomous vehicles 20 running on a plurality of tracks 15. The tracks 15 form a network of tracks with junctions over which the autonomous vehicles 20 are able to run. It will be appreciated that the tracks 15 may include guide rails, such as steel rails or concrete guidance elements, but could also comprise separated roadways. It is envisaged that the tracks 15 could also be incorporated into regular roadways and streets as long as sufficient safety measures are incorporated. The tracks 15 are provided with a plurality of beacons 17 (similar to rail balises) which monitor the progress of the autonomous vehicles 20 and can also send signals to the autonomous vehicles 20 using a vehicle antenna 25 mounted on the autonomous vehicle 20.

The autonomous vehicle 20 has not only the aforementioned vehicle antenna 25 and a vehicle memory 28 but will also include an onboard processor 27 which can control the autonomous vehicle 20 using the information in the vehicle memory 25 and any information received from the beacons 17. The autonomous vehicle 20 is also equipped with brakes and may be equipped with object detectors. The object detectors are used to detect any objects, such as logs, stones, people, etc. that may be present on the track 15 in front of the autonomous vehicle 20. The object detector, if present, will issue a signal to the autonomous vehicle 20 to apply the brakes if one or more of the objects are detected.

The autonomous vehicles 20 will be running on one or more of a plurality of routes 50 in the autonomous transportation network 10. The routes 50 are connected together at junctions 56, as shown in FIG. 2. The junctions 56 could be simple merge junctions 56 in which one of the routes joins another one of the routes, a roundabout (also called traffic circle or rotary), with several routes 50 entering and exiting the roundabout, or a more complicated arrangement with a plurality of inward routes and outward routes. The routes 50 could comprise a single pathway in which ones of the autonomous vehicles 20 are in a single file travelling at substantial the same velocity. The routes 50 could have parallel pathways in which two or more of the autonomous vehicles 20 can travel substantially parallel to each other, such as is typically the case on a limited access freeway (also called motorway). The autonomous vehicles 20 include assist systems of Level 2 or Level 3, as defined in the introduction. The autonomous vehicle 20 is capable of autonomously travelling in the transportation network 10 using the onboard processor 27. The autonomous vehicles 20, therefore, do not require a driver for driving of the autonomous vehicle 20. A typical velocity in an urban environment for the autonomous vehicles 20 would be for example, 50 km/hour, but it will be appreciated that the method set out in this document is not limited by the speed of the autonomous vehicles 20.

The time between the autonomous vehicles 20 travelling in the single file is set to be about 0.5 seconds to allow a sufficient safety margin to allow emergency braking. This leads to a distance of about 6 m between each one of the autonomous vehicles 20. It will be appreciated that these values are not limiting of the invention. Slower and heavier autonomous vehicles 20 may require a smaller or larger distance between the autonomous vehicle 20 to provide an additional margin of safety.

Figure 2A:
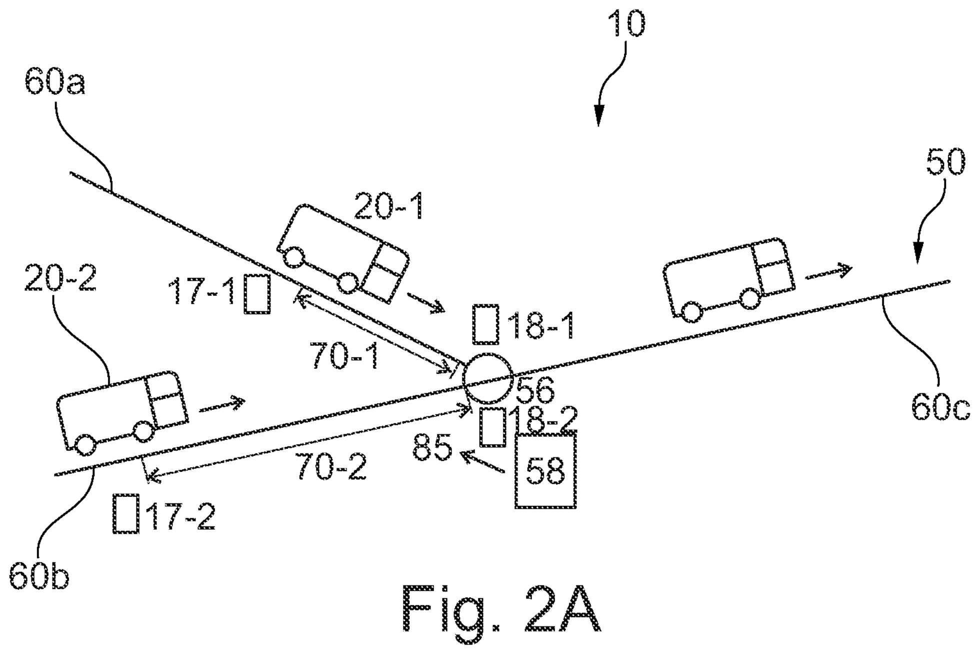
FIGS. 2A and 2B show an example of a junction.
Figure 2B:
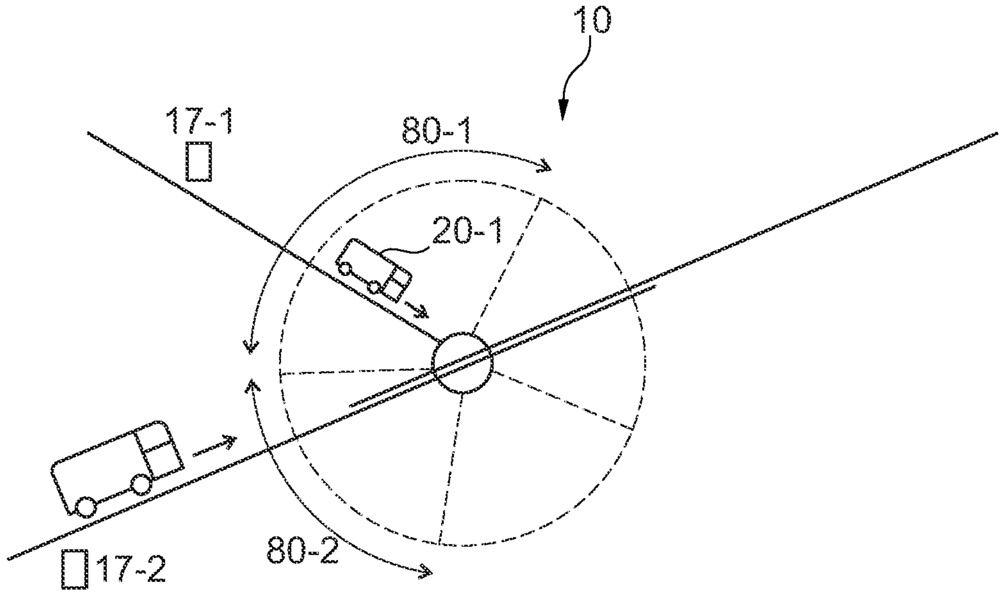

FIGS. 2A and 2B show an example of the management of autonomous vehicles 20 at the junction 56. In this case, a simple junction 56 is shown which comprises two inward routes 60*a* and 60*b* merging and leading to an outward route 60*c*. A first autonomous vehicle 20-1 is travelling on the first one of the two inwards routes 60*a* and a second autonomous vehicle 20-2 is travelling on the second one of the two inwards routes 60*b*. Both of the autonomous vehicles 20-1 and 20-2 are travelling at the same velocity at a distance 70-1 and 70-2 from the junction 56. The junction 56 is equipped with a junction controller 58 and beacons 17-1 and 17-2 which are in communication with the arriving autonomous vehicles 20-1 and 20-2 through an antenna and sending messages 19 in the form of signals to the onboard processors 27 of the autonomous vehicles 20 through their vehicle antennas 25. Typically, the beacons 17-1 and 17-2 are around 50 m from the junction 56, but this is not limiting of the invention.

The protocols used in the communication between the beacons 17-1 and 17-2 and the autonomous vehicles 20-1 and 20-2 are, for example, NFC (near-field communication) protocols, but this is not limiting of the invention. The NFC protocols are short-range wireless protocols which can transmit data over a short distance. The NFC protocols are secure and, because of their short range, more difficult to hack than a network-wide communication protocol. The beacons 17-1 and 17-2 are connected to the junction controller 58. Only a limited amount of information needs to be transmitted from the autonomous vehicles 20-1 and 20-2 to the beacons 17-1 and 17-2. In one aspect only an identification number of the autonomous vehicle 20-1 or 20-2 is transmitted and no further information will be transmitted. This limits the amount of communication traffic and enables reliability of the communication.

Suppose now that both of the autonomous vehicles 20-1 and 20-2 are approximately the same distance (e.g. 50 m) from the junction 56, i.e. first distance 70-1 of the first autonomous vehicle 20-1 is approximately the same as the second distance 70-2 of the second autonomous vehicle 20-2 from the junction 56. The junction controller 58 knows that the normal velocity of the autonomous vehicles 20-1 and 20-2 is 50 km/hour (as described above) and thus the junction controller 58 can calculate a time of arrival for both of the autonomous vehicles 20-1 and 20-2 by assuming that the autonomous vehicles 20-1 and 20-2 are travelling at this normal velocity. If both of the autonomous vehicles 20-1 and 20-2 were to continue at the same velocity, then the two autonomous vehicles 20-1 and 20-2 would conflict and possibly collide at the junction 56. There is therefore the need for a junction control system to manage the approach of the autonomous vehicles 20-1 and 20-2 to the junction 56.

The junction control system achieves this by defining time slots 80 as shown in FIG. 2B. Each time slot is sufficiently long that an autonomous vehicle 20 can enter the junction 56 at an entry time and exit the junction 56 at an exit time thus defining a set period of time for the exclusive passage of the autonomous vehicle 20 through the junction 56. The next set period of time can then be allocated to the next autonomous vehicle 20 that wishes to enter the junction 56. This is similar to a rotating door or barrier such as found in some buildings that allows only the passage of a single person through the rotating door at one time.

The length of the period of time will depend on the velocity of the autonomous vehicles through the junction 56 and also on the capacity of the outward route 60*c*. It was noted above that the autonomous vehicles 20 are travelling at 50 km/hour with a time of 0.5 s between each one of the autonomous vehicles 20. This will therefore be typically the length of the period of time of the time slot 80. It is possible in some aspects to change the length of the time slot 80 to cater for additional safety margins at the junction 56 of the need, for example at a roundabout, for the autonomous vehicle 20 to slow down for the comfort of the passengers in the autonomous vehicle 20 who would otherwise experience large side forces whilst going around the curved path of the roundabout.

It was noted in the Applicant's co-pending UK patent application No. 2003395.7, the contents of which are incorporated herein by reference, that a control management system for the autonomous transportation network 10 monitors the progress of the autonomous vehicles 20 through the autonomous transportation network 10. Information about the progress is passed to the junction controller 58 and thus the junction controller 58 will know when one or more of the autonomous vehicles 20 is to be expected at the junction 56. Thus, the data transmission from the autonomous vehicle 20 at one of the beacons 17 is used to confirm that the autonomous vehicle 20 is on time. It is possible that the autonomous vehicle 20 is delayed because of a defect or a bad track 15, for example, and the junction controller 58 will therefore resolve potential conflicts at the junction 56 on detection of the arrival of the autonomous vehicle 20.

In one aspect of the invention, there may be second beacons 18-1 and 18-2 set up on the inward routes 60*a* and 60*b*. The second beacons 18-1 and 18-2 receive also the vehicle identification and transmit the vehicle identification to the junction controller 58. The second beacons 18-1 and 18-2 serve as a fallback safety device. If the junction controller 58 knows that there is still one of the autonomous vehicles 20 on the junction 56 when a second one of the autonomous vehicles 20 is about to enter the junction 56, then the junction controller 58 can initiate an emergency stop. In an ideal world, such a conflict should never occur, but there may be problems such as a breakdown of the first one of the autonomous vehicles 20 at the junction 56.

Figure 3:
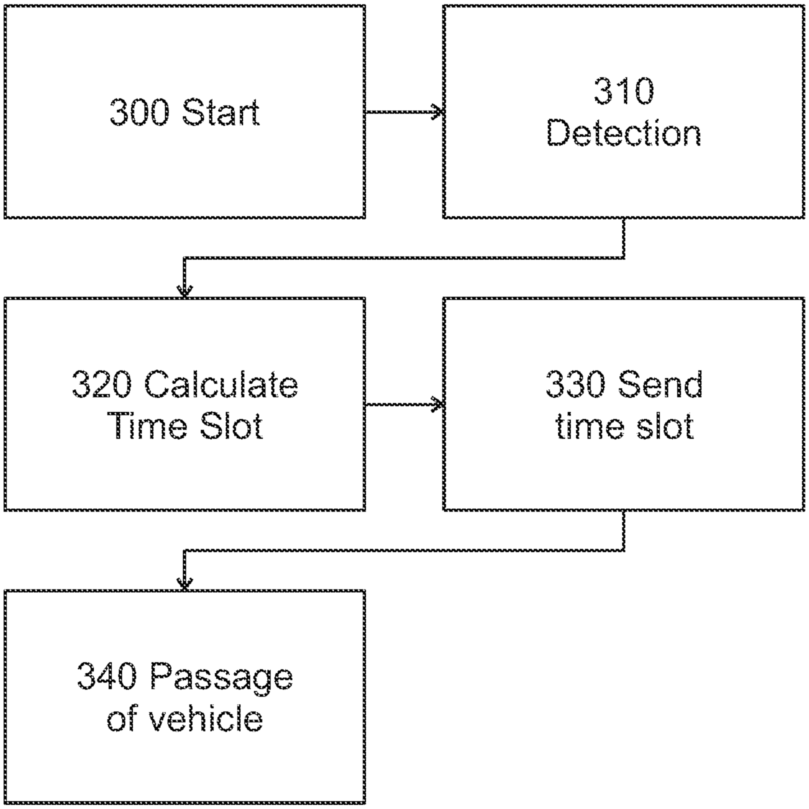
FIG. 3 shows the method of operation.

FIG. 3 shows how the workflow of the management of the autonomous vehicles at the junction 56 and starts at step 300. In step 310 the approach of the autonomous vehicles 20 to the junction 56 is detected by the transmission of the identification of the autonomous vehicle 20 to one of the beacons 17*a* or 17*b* on the inward route 60*a* or 60*b*. The junction controller 58 calculates in step 320 the time slot 80 and allocates the time slot 80 for each of the autonomous vehicles 20 to pass through the junction 56. The time slots 80 include an entry time at which the autonomous vehicle 20 should enter the junction 56 and an exit time at which the autonomous vehicle 20 should exit the junction 56. The time slot 80 allocated is unique to the allocated one of the autonomous vehicle 20 and there are no overlapping time slots 80. In other words, the time slots 80 are allocated so that only one of the autonomous vehicles 20 passes through the junction 56 at any one point in time and that therefore there should never be two autonomous vehicles 20 at the junction 56 at the same time.

The junction controller 58 knows the distance 70 of the autonomous vehicle 20 from the junction 56 and either assumes the velocity of the autonomous vehicle 20 (i.e. 50 km/hour, typically) and is therefore able to calculate the expect time of arrival at the junction 56 in step 320 from the velocity of the autonomous vehicle 20 and the distance 70. The junction controller 58 sends time slot data 85 about the allocates time slot 80 with the calculated entry time and the exit time to the arriving autonomous vehicle 20 in step 330. Passage of the autonomous vehicle 20 at the junction 56 is therefore reserved for this autonomous vehicle 20 receiving the time slot data 85 at the calculated times.

In many modes of operation and at many times of the day, the allocation of the time slot 80 to any one of the autonomous vehicles 20 is simple. There are no conflicts and no potentially overlapping time slots 80. The autonomous vehicle 20 can pass through the junction 56 with no change of velocity in step 340

Suppose, however, that the junction controller 58 detects in step 310 that there are two autonomous vehicles 20-1 and 20-2 arriving at the junction 56 almost simultaneously or with a slight delay. The junction controller 58 will identify from the calculated time slots 80 in step 320 that there is a potential conflict and if no action is taken the two autonomous vehicles 20-1 and 20-2 could potentially meet and collide at the junction 56. In this case, the junction controller 58 will allocate a first time slot 80-1 to a first one of the arriving autonomous vehicles 20-1 and send the allocated first time slot 80-1 to the first autonomous vehicle 20-1 as first time slot data. The junction controller 58 will then calculate a second time slot 80-2 for the second arriving one of the autonomous vehicles 20-2. The second time slot 80-2 will not be contemporaneous with the first time slot. In other words, the second entry time for the second autonomous vehicle 20-2 will be later than the first exit time for the first autonomous vehicle 20-1. The second time slot data with the second entry time will be sent to the second autonomous vehicle 20-2 (step 330).

The second autonomous vehicle 20-2 receives the second time slot data and processes the second time slot data in the onboard processor 27. This onboard processor 27 will calculate that, at the current velocity, the second autonomous vehicles 20-2 will arrive too early at the junction 56 to pass through the junction 56, i.e. before the second time slot 80-2 starts. The onboard processor 27 will then calculate the velocity required for the second autonomous vehicle 20-2 to arrive at the junction 56 at the second entry time and reduce the velocity of the second autonomous vehicle 20-2 to the optimal velocity so that the second autonomous vehicle 20-2 arrives at the junction 56 at the second entry time. The distance 70-2 from the junction 56 to the second autonomous vehicle 20-2 is generally such that only a small reduction in velocity is required. Suppose the velocity is 50 km/hour then typically a reduction of only 3-5 km/hour is required and this reduction in speed is unlikely to be noted by a passenger travelling in the second autonomous vehicle 20-2. It will be noted that the reduction in velocity can also be dependent on the state of the track 15 at the junction 56 or the local weather conditions. For example, if there is known to be ice on the track 15, then the velocity must be reduced in a different manner than if the track 15 is dry.

The onboard processor 27 of the first autonomous vehicle 20-1 generally knows the distance 70-1 between the first autonomous vehicle 20-1 and the junction 56. The onboard processor 27 of the second autonomous vehicle 20-2 knows the distance 70-2 of the second autonomous vehicle 20-2 and the junction 56. The onboard processor 27 of the first autonomous vehicle 20-1 also knows the velocity of the first autonomous vehicle 20-1. The onboard processor 27 of the second autonomous vehicle 20-2 knows the velocity of the second autonomous vehicle 20-2. The onboard processor 27 is also, for example, aware of the state of the track 15 at the junction 56 or the local weather conditions at the junction 56.

The first time slot 80-1 including the entry time and the exit time for the first autonomous vehicle 20-1 are sent by the junction controller 58 to the first autonomous vehicle 20-1 (see step 330 below). Similarly, the second time slot 80-2 including the entry time and the exit time for the second autonomous vehicle 20-2 are sent by the junction controller 58 to the second autonomous vehicle 20-2. The onboard processor 27 of the first autonomous vehicle 20-1 calculates and adjusts in step 340, using the received first time slot 80-1, the velocity of the first autonomous vehicle 20-1 for the passage of the first autonomous vehicle 20-1 through the intersection 56 in the first time slot 80-1. The calculating and adjusting in step 340 is done by the onboard processor 27 of the first autonomous vehicle 20-1 independently from the junction controller 58.

Similarly, the onboard processor 27 of the second autonomous vehicle 20-2 calculates and adjusts in step 340, using the received second time slot 80-2, the velocity of the second autonomous vehicle 20-2 for the passage of the second autonomous vehicle 20-2 through the intersection 56 in the second time slot 80-2. The calculating and adjusting in step 340 of the second autonomous vehicle 20-2 is done by the onboard processor 27 of the second autonomous vehicle 20-2 independently from the junction controller 58.

There is no need for the junction controller 58 to send commands for the velocity and/or the time at which to assume the velocity to the autonomous vehicles 20. The onboard processors 27 of the first autonomous vehicle 20-1 and/or of the second autonomous vehicle 20-2 calculate and adjust the velocity of the respective first autonomous vehicle 20-1 and/or of the second autonomous vehicle 20-2 independently from the junction controller 58. The autonomous vehicles 20 are capable of autonomously passing through the intersection 56 by using the assist systems of Level 2 or Level 3, as described above.

After the reduction in speed, for example, the second autonomous vehicle 20-2 arrives at the junction 56 at the second entry time without any conflict at the junction 56. The second autonomous vehicle 20-2 can then accelerate to the regular velocity, i.e. 50 km/hour, and pass through the junction 56. The second autonomous vehicle 20-2 may also, however, pass through the junction 56 at a lower or higher velocity than the regular velocity and accelerate or decelerate after passing through the junction 56. The onboard processor 27 can accelerate or decelerate the autonomous vehicle 20 before and/or during the passage through the junction 56 depending on the state of the track 15 at the junction 56, the local weather conditions, or for the comfort of the passengers.

The prioritizing of the first autonomous vehicle 20-1 or the second autonomous vehicle 20-2 at the junction 56 is generally based on detection of the presence of the first one of the arriving autonomous vehicles 20-1 or 20-2 in step 310 by the junction controller 58. It would of course be possible to use other priority criteria. For example, one of the arriving autonomous vehicles 20-1 or 20-2 could be a slower moving autonomous vehicle 20 and would therefore receive the second time slot 80-2 even if the slower moving autonomous vehicle 20 were in fact the first autonomous vehicle 20-1 to indicate its presence to the junction controller 58. Alternately one of the arriving autonomous vehicles 20-1 or 20-2 could in fact be a priority vehicle which receives priority at all of junctions 56 and is always allocated the first available time slot 80-1 on arrival at the junction 56.

It will be noted that there is no need for the autonomous vehicles 20-1 or 20-2 departing on the outward routes 65, 65*a* or 65*b* to be managed. The effect of the allocation of the time slots at the junction 56 will mean that the autonomous vehicles 20 on the outward route 65 will be spaced appropriately apart from each other.

In the above simple example, it was assumed that the autonomous vehicle 20 do not slow down whilst passing through the junction 56. This may be true for a simple junction 56 as shown in FIG. 2, but as noted above if the junction 56 is a roundabout then it is likely that the autonomous vehicle 20 will slow slightly for the comfort of the passengers in the vehicle.

Figure 4:
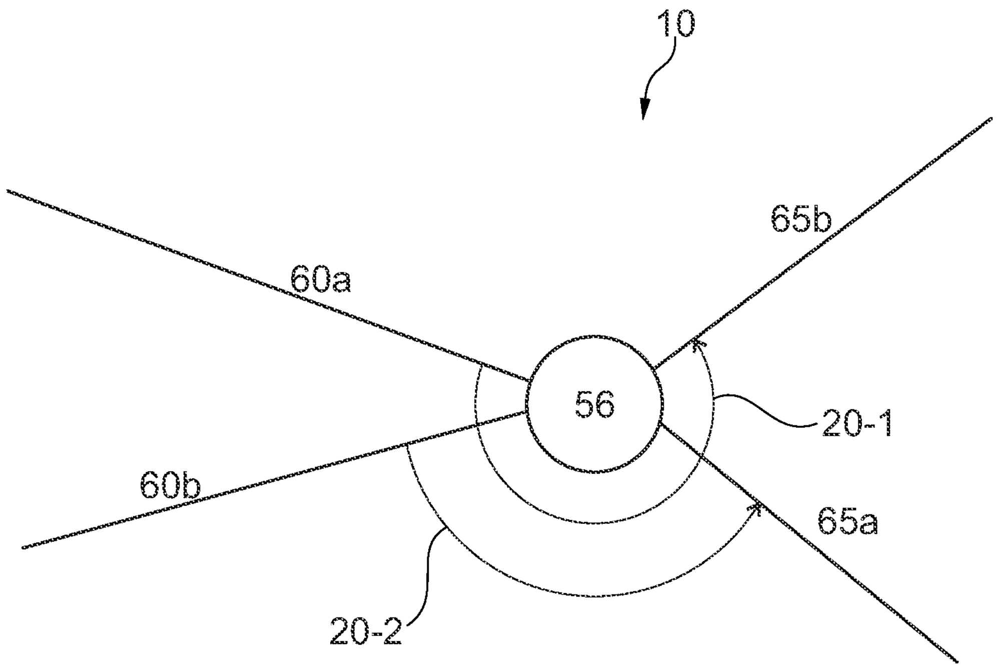
FIG. 4 shows a junction with multiple outward routes.

The approach taken above can be adopted for more complicated junctions 56. FIG. 4 shows, for example, a junction 56 with two inward routes 60*a, b* and two outward routes 65*a, b*. The same principle of calculating in step 320 the time slots for the arriving autonomous vehicles 20 applies. However, the time slots might be slightly different in length so that the first autonomous vehicle 20-1 passing, for example, from the first inward route 60*a* to the second outward route 65*b* requires slightly more time than the second autonomous vehicle 20-2 because of the slightly larger distance through the junction 56. The junction controller 58 receives the routing information by wireless transmission from the arriving autonomous vehicles 20-1 and 20-2 in step 310 and can make this calculation taking into account the slightly longer time required to pass through the junction 56.

Figure 5:
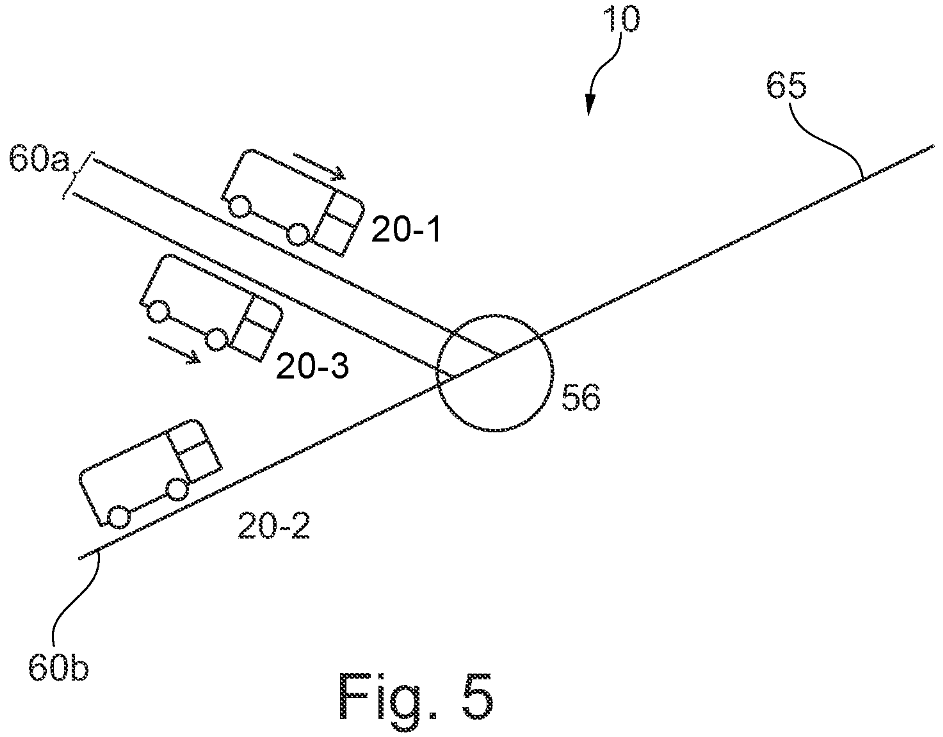
FIG. 5 shows a junction with parallel arriving autonomous vehicles.

The principle can be adopted for autonomous vehicles 20 on multi-lane tracks 15 merging onto single-lane tracks 15, as shown in FIG. 5 in which on the first inward route 60*a* there are two autonomous vehicles 20-1 and 20-3 travelling essentially in parallel with each other and possibly at the same velocity for passing through the junction 56 and merging onto the single-lane track 15. The junction controller 58 receives the information about the parallel arriving autonomous vehicles 20 and allocates different time slots for each of the arriving autonomous vehicles 20-1 and 20-3. One of the arriving autonomous vehicles 20-1 and 20-3 will then be slowed slightly to avoid a conflict at the junction 56.

The junction controller 58 allocates the first timeslot 80-1 to the first autonomous vehicle 20-1 and the second time slot 80-2 to the second autonomous vehicle 20-2. The onboard processor 27 of the first autonomous vehicle 20-1 independently calculates and adjusts the velocity of the first autonomous vehicle 20-1 to arrive at the junction 56 at the assigned entry time of the first time slot 80-1. The onboard processor 27 of the second autonomous vehicle 20-2 independently calculates and adjusts the velocity of the second autonomous vehicle 20-2 to arrive at the junction 56 at the assigned entry time of the second time slot 80-2. In the example of FIG. 5, the first autonomous vehicle 20-1 and the second autonomous vehicle 20-2 merge lanes before or during the passage through the intersection 56.

The idea can of course be applied to a junction 56 in which there are multiple routes through the junction 56, such as a large gyratory system with multiple lanes. In this case, different non-conflicting and non-contemporaneous time slots can be allocated to the autonomous vehicles 20 wishing to pass through the junction 56.

Figure 6A:
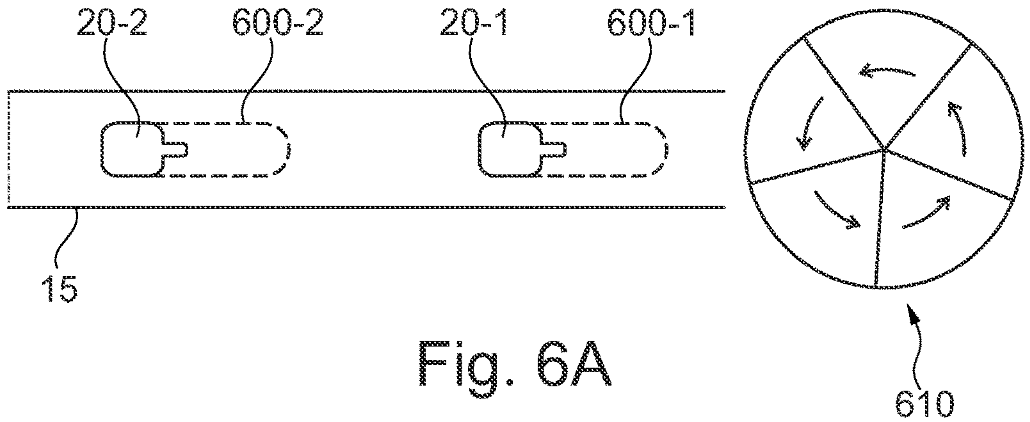
FIG. 6A shows a kinematic envelope in front of an autonomous vehicle.

The concept behind this method can be generalized by considering FIG. 6A which shows two autonomous vehicles 20-1 and 20-2 on the track 15. A so-called "kinematic envelope" 600-1 and 600-2 is shown surrounding each of the autonomous vehicles 20-1 and 20-2 and extending in a space in front of the autonomous vehicles 20-1 and 20-2. The kinematic envelope 600 shows the area of the track 15 which is occupied by one of the autonomous vehicles 20-1 or 20-2 in the next period of time. The kinematic envelope 600-1 and 600-2 is a rolling or moving envelope and moves with the autonomous vehicle 20-1 or 20-2. The kinematic envelope 600-1 and 600-2 is used by the junction controller 58 to calculate the time slots 80 of the autonomous vehicles 20 for the passage through the junction 56.

The purpose of the kinematic envelope 600-1 and 600-2 is to establish a zone or an area within which the autonomous vehicle 20-1 or 20-2 is free to move at its current velocity and there is no or little risk of a conflict with another one of the autonomous vehicles. The size of the kinematic envelope 600-1 and 600-2 depends therefore on, for example, the velocity of the autonomous vehicle 20. The size of the kinematic envelope 600-1 and 600-2 can further depend on the size of the autonomous vehicle 20, a weight and/or load of the autonomous vehicle 20, the passenger/passengers of the autonomous vehicle 20, and/or the maximum acceleration/deceleration of the autonomous vehicle 20. The size of the kinematic envelope 600-1 and 600-2 may also depend on the local weather conditions at the junction 56. For example, an autonomous vehicle travelling at 50 km/hour needs about a space of 0.5 seconds in front of the vehicle to avoid a conflict. This leads to a distance of just under 7 m. A conflict should be avoided if nothing enters the kinematic envelope 600-1 and 600-2 extending approximately 7 m in front of the autonomous vehicle 20.

This concept can be used to ensure that the autonomous vehicles 20 are equally distributed along the track 15. The rotating door concept is used to define slots through which the autonomous vehicles can pass at any position 610. If we assume that the autonomous vehicles 20 should all be travelling at 50 km/hour (as noted above) then the rotating door (shown at the position 610 on FIG. 6A) will have equally spaced time slots though which the autonomous vehicles can pass. Should one of the autonomous vehicles 20 arrive too early for its time slot to pass through the "rotating door", then the autonomous vehicle 20 can be slowed down on its approach to the position 610 as explained above in connection with the approach to the junction 56. The size of the time slot and the entry time at the position 610 will correspond to the kinematic envelope 600 of the autonomous vehicle 20.

The rotating door concept does not involve an actual physical rotating door at the position 610 but is used to illustrate the concepts of time slots through which an autonomous vehicle 20 passes a particular position 610. In the discussion above, this position 610 was the junction 56, but the concept applies equally to other defined positions 610 along the track 15.

Figure 6B:
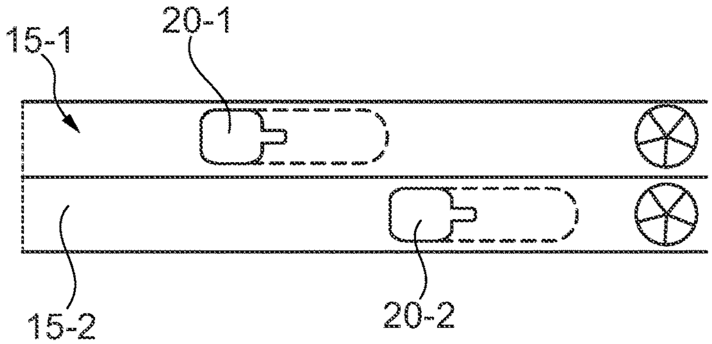
FIG. 6B shows two autonomous vehicles on parallel tracks

In a further aspect of the method, there may be two or more parallel tracks 15-1 and 15-2 along which the autonomous vehicles 20 are running, as shown in FIG. 6B, which also shows the junction 56. In this aspect, different time slots are calculated for different vehicles on different ones of the tracks 15. In other words, there are two "rotating doors" operating in parallel to ensure that the autonomous vehicles 20 do not conflict on the different tracks 15.

Figure 6C:
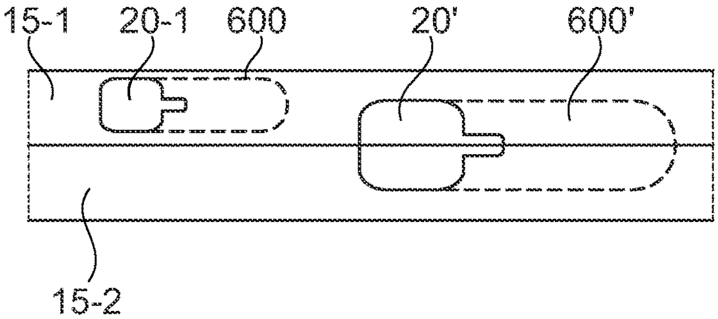
FIG. 6C shows a larger autonomous vehicle and a smaller autonomous vehicle.

The above discussion assumes that the size of the autonomous vehicle 20 is constant. There may, however, be larger autonomous vehicles 20' used, for example, for freight purposes. In this case, the kinematic envelope 600' will be wider, as is shown in FIG. 6C and indeed occupy the space of two tracks 15-1 and 15-2 on which a "normal" autonomous vehicle 20 would travel. Any other autonomous vehicles 20 travelling nearer the larger autonomous vehicles 20' will need to ensure that their own kinematic envelope 600 does not overlap with that kinematic envelope 600' of the larger autonomous vehicle 20'. The rotating door concept discussed above can be equally applied to this aspect. For the "normal" autonomous vehicles travelling independently on the two tracks 15 there are two, independently operating, rotating doors, whereas the same track 15 has a single rotating door enabling conflict-free passage of the larger autonomous vehicles 20' in the appropriate time slot. It will be appreciated that it is possible for both large autonomous vehicles 20' and smaller or regular autonomous vehicles 20 to share the tracks 15. The rotating door concept discussed above will be adapted depending on whether two regular autonomous vehicles 20 or one large autonomous vehicle 20' wish to pass the junction 56. The junction controller 58 makes the appropriate adaptation to ensure that there are no conflicts.

Figure 6D:
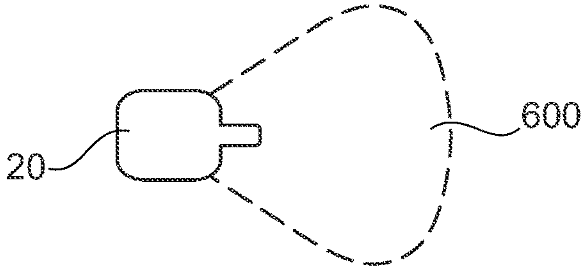
FIG. 6D shows a kinematic envelope for an autonomous vehicle which can change direction.

The discussion above has assumed that the autonomous vehicles 20 move in straight lines. It is possible that on a wider track 15, that the autonomous vehicles 20 can change direction and almost move to one side or another to take advantage of the available space on the track 15. This is shown in FIG. 6D which shows the kinematic envelope 600 as a circular sector extending in front of the autonomous vehicle 20. The autonomous vehicle 20 receives the messages 19 from the beacons 17 at the side of the track 15 to change direction as well as the velocity.

The size of the kinematic envelope 600 will depend on the velocity of the autonomous vehicle 20. It is likely that the usual velocity of a freight-carry autonomous vehicle 20 would be less than 50 km/hour. However, the method discussed above would be equally applicable to such slower autonomous vehicles 20.

REFERENCE NUMERALS

10 Autonomous transportation network
15 Tracks
17 Beacons
18 Second beacons
19 Messages
20 Autonomous vehicles
25 Vehicle antenna
27 Onboard processor
28 Vehicle memory
50 Route
56 Junction
58 Junction controller
60*a, b* Inward route
60*c* Outward route
65 Outward route
70-1,2 Distance
80 Time slots
85 Time slot data
600 Kinematic envelope
610 Position

The invention claimed is:

1. A method of controlling a plurality of autonomous vehicles entering a junction from a plurality of inward routes and leaving the junction in at least one outward route, the method comprising:

calculating a first time slot for entering the junction on a first inward route of the plurality of inward routes for a first autonomous vehicles of the plurality of autonomous vehicles, wherein the first time slot has a first entry time at which the first autonomous vehicle enters the junction;

communicating from a beacon to the first autonomous vehicle first time slot data relating to the first time slot;

adjusting the velocity of the first autonomous vehicle by an onboard processor such that the first autonomous vehicle arrives at the junction at the first entry time;

calculating a second time slot for entering the junction for a second autonomous vehicle of the plurality of autonomous vehicles arriving on a second inward route of the plurality of inward routes different than the first inward route of the first autonomous vehicle, wherein the second time slot has a second entry time at which the second autonomous vehicle enters the junction and wherein the second entry time is later than the first entry time such that the second autonomous vehicle does not impact the first autonomous vehicle;

communicating from the beacon to the second autonomous vehicle second time slot data real including the second entry time; and adjusting the velocity of the second autonomous vehicle by the onboard processor to arrive at the second entry time.

2. The method of claim 1, wherein the second entry time is after the time at which the first autonomous vehicle exits the junction.

3. The method of claim 1 further comprising calculating a third time slot for entering the junction for a third autonomous vehicle of the plurality of autonomous vehicles, wherein the third autonomous vehicle is travelling parallel to the first autonomous vehicle on a same one of the first inward route and wherein the third time slot has a third entry time at which the third autonomous vehicle enters the junction;

communicating from the beacon to the third autonomous vehicle third time slot data including the third entry time, wherein the third entry time is later than the first entry time; and adjusting the velocity of the third autonomous vehicle by the onboard processor to arrive at the third entry time.

4. The method of claim 1, wherein the at least two of the velocities of the first autonomous vehicle, the second autonomous vehicle and the third autonomous vehicle are substantially identical at a distance from the junction.

5. The method of claim 1, wherein durations of the first time slot, the second time slot and the third time slot is dependent on the type of the ones of the autonomous vehicles entering the junctions.

6. The method of claim 1, wherein ones of the plurality of autonomous vehicles exit the junction on a plurality of outward routes.

7. The method of claim 1, further comprising transmitting to the beacon an identification of the autonomous vehicle.

8. The method of claim 1 comprising:

transmitting, by at least two approaching autonomous vehicles, an identification of each of the approaching autonomous vehicles;

detecting, with a beacon, the identification of the least two approaching autonomous vehicles;

calculating the first time slot in a junction controller using the identification of a first autonomous vehicle of the plurality of autonomous vehicles and a predefined velocity; and calculating the second time slot in a junction controller using the identification of a second autonomous vehicle of the plurality of autonomous vehicles and a predefined velocity.

9. A junction administration system for administering a flow of autonomous vehicles entering a junction on a plurality of inward routes and leaving the junction on at least one outward route, the junction administration system comprising:

a processor for calculating a plurality of adjacent time slots and allocating single ones of the time slots to ones of the autonomous vehicles desiring to enter the junction;

a beacon for communicating the allocated one of the time slots to a corresponding one of the autonomous vehicles, wherein the junction is equipped with said beacon.

10. A method for controlling an autonomous vehicle entering a junction comprising:

receiving from a beacon time slot data including a unique entry time for indicating the time of entry of the autonomous vehicle at the junction;

calculating in an onboard processor required time from position of receipt of time slot data to the junction; and adjusting velocity of the autonomous vehicle by an onboard processor to enable arrival at the junction at the unique entry time.

11. The method of claim 10, further comprising transmitting an identification number of the autonomous vehicle to the beacon.

12. A method of controlling a plurality of autonomous vehicles at a position, the method comprising:

calculating a first time slot for entering the position for a first autonomous vehicles of the plurality of autonomous vehicles, wherein the first time slot has a first entry time at which the first autonomous vehicle enters the position;

communicating from a beacon to the first autonomous vehicle first time slot data relating to the first time slot;

adjusting the velocity of the first autonomous vehicle by an onboard processor such that the first autonomous vehicle arrives at the position at the first entry time;

calculating a second time slot for entering the position for a second autonomous vehicle of the plurality of autonomous vehicles, wherein the second time slot has a second entry time at which the second autonomous vehicle enters the position and wherein the second entry time is later than the first entry time such that the second autonomous vehicle does not impact the first autonomous vehicle;

communicating from the beacon to the second autonomous vehicle second time slot data real including the second entry time; and adjusting the velocity of the second autonomous vehicle by the onboard processor to arrive at the second entry time.

13. A method of controlling one or more autonomous vehicles travelling on one or more tracks comprising:

defining a kinematic envelope as a region of space about the autonomous vehicle, wherein the kinematic envelope is dependent on at least one of size, direction and velocity of the autonomous vehicle;

calculating at least one of a direction or velocity of the autonomous vehicle such that the kinematic envelope of the autonomous vehicle does not conflict with a further one of the autonomous vehicles;

receiving at the autonomous vehicle messages from one or more beacons near the tracks to adjust at least one of the direction or the velocity of the autonomous vehicle by an onboard processor.

14. The method of claim 13, further comprising calculating a first time slot for entering into a junction of a first autonomous vehicle of the one or more autonomous vehicles, wherein the first time slot has a first entry time at which the first autonomous vehicle enters the junction;

communicating from a beacon to the first autonomous vehicle first time slot data relating to the first time slot;

adjusting the velocity of the first autonomous vehicle by the onboard processor such that the first autonomous vehicle arrives at the position at the first entry time;

calculating a second time slot for entering the position for a second autonomous vehicle of the plurality of autonomous vehicles, wherein the second time slot has a second entry time at which the second autonomous vehicle enters the position and wherein the second entry time is later than the first entry time such that the kinematic envelope of the second autonomous vehicle does not impact the first autonomous vehicle;

communicating from the beacon to the second autonomous vehicle second time slot data real including the second entry time; and adjusting the velocity of the second autonomous vehicle by the onboard processor to arrive at the second entry time.

* * * * *